United States Patent
Song et al.

(10) Patent No.: US 8,761,783 B2
(45) Date of Patent: Jun. 24, 2014

(54) METHOD OF TRANSMITTING USER MESSAGE, TERMINAL AND BASE STATION USING THE METHOD

(75) Inventors: Pyeong Jung Song, Daejeon (KR); Soongi Park, Daejeon (KR); Kyung Sook Kim, Daejeon (KR); Jaesheung Shin, Daejeon (KR); Gyung-chul Shin, Daejeon (KR); Yeon Seung Shin, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 878 days.

(21) Appl. No.: 12/887,046

(22) Filed: Sep. 21, 2010

(65) Prior Publication Data

US 2011/0069837 A1    Mar. 24, 2011

(30) Foreign Application Priority Data

Sep. 22, 2009 (KR) .................. 10-2009-0089672
Sep. 20, 2010 (KR) .................. 10-2010-0092710

(51) Int. Cl.
*H04W 72/00* (2009.01)
*H04W 72/04* (2009.01)
*H04W 72/12* (2009.01)

(52) U.S. Cl.
CPC .............. *H04W 72/04* (2013.01); *H04W 72/12* (2013.01); *H04W 732/1205* (2013.01); *H04W 72/1221* (2013.01); *H04W 72/1226* (2013.01); *H04W 72/1278* (2013.01)
USPC ........ 455/450; 455/466; 455/412.1; 370/328; 370/349; 370/341

(58) Field of Classification Search
CPC . H04W 72/04; H04W 72/12; H04W 72/1205; H04W 72/1221; H04W 72/1226; H04W 72/1278
USPC ........ 380/270; 455/450, 466, 412.1; 370/328, 370/349, 341
See application file for complete search history.

(56) References Cited

U.S. PATENT DOCUMENTS

| | | | | |
|---|---|---|---|---|
| 5,878,351 | A * | 3/1999 | Alanara et al. | 455/466 |
| 6,693,893 | B1 * | 2/2004 | Ehlinger | 370/352 |
| 2008/0310391 | A1 * | 12/2008 | Schneidman et al. | 370/349 |
| 2009/0117931 | A1 * | 5/2009 | Shin et al. | 455/522 |
| 2009/0175210 | A1 * | 7/2009 | Vijayan et al. | 370/312 |
| 2012/0044897 | A1 * | 2/2012 | Wager et al. | 370/329 |

* cited by examiner

*Primary Examiner* — Khai M Nguyen
(74) *Attorney, Agent, or Firm* — Nelson Mullins Riley & Scarborough LLP

(57) ABSTRACT

When transmitting a user message, in a call setting period of a base station and a terminal and a radio connection state between a base station and a terminal, whenever a data transmittable channel resource is available, user messages of an amount corresponding to the available channel resource are transmitted. Therefore, user messages can be divided and transmitted according to an available channel in a call setting period.

16 Claims, 8 Drawing Sheets

METHOD OF TRANSMITTING USER MESSAGE, TERMINAL AND BASE STATION USING THE METHOD

CROSS-REFERENCE TO RELATED APPLICATION

This application claims priority to and the benefit of Korean Patent Application No. 10-2009-0089672 and No. 10-2010-0092710 filed in the Korean Intellectual Property Office on Sep. 22, 2009 and Sep. 20, 2010, the entire contents of which are incorporated herein by reference.

BACKGROUND OF THE INVENTION (a) Field of the Invention

The present invention relates to a method of transmitting a user message, and a terminal and a base station using the method in a wireless communication system.

(b) Description of the Related Art

Nowadays, data transmission in a wireless communication system generally uses a packet method. In third generation partnership project (3GPP) long term evolution (LTE) and LTE-Advanced, after a radio connection is set between a terminal and a network, when a resource allocation request necessary for transmitting data is transmitted from the terminal, a necessary radio resource is allocated at a necessary time and data transmission is performed based on the allocated radio resource. Such a procedure is commonly applied to all data transmission regardless of a small quantity of data or a large quantity of data, and a data size.

Therefore, for a small quantity of user messages, until a radio connection is complete, the above call processing procedure is performed and thus overhead of signaling for a transmission processing of a small quantity of user messages is not small. In this case, packet method-based wireless data transmission may be effective, but a signaling load has no large difference, compared with an existing method.

Moreover, when a demand of a user message is a large scale, as in a short message service (SMS), an overall signaling load for the large scale demand sharply increases. For example, when one or two of messages necessary for SMS call setting is reduced, an overall signaling load can be sharply reduced and thus an efficient method for a transmission processing of a small quantity of messages is requested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for transmitting a user message having advantages of effectively transmitting a small quantity of messages in a wireless communication system.

The present invention has been made in an effort to further provide a method and apparatus for transmitting a user message having advantages of dividing and transmitting a user message on at least one step basis or for transmitting a user message with a different transmission method according to a size of the user message whenever a radio channel resource is available during a call setting period.

An exemplary embodiment of the present invention provides a method for transmitting a user message that is stored at a buffer through a network in a terminal, the method including: performing a first transmission of transmitting a user message through a radio channel of a common resource; performing a second transmission of transmitting, when a user message remains in the buffer, the user message through a signaling radio bearer channel or a default data radio bearer channel; and performing a third transmission of transmitting, when a user message remains in the buffer, the user message through a scheduled physical uplink shared channel (scheduled-PUSCH) that is dedicated allocated to the terminal.

The method may further including a fourth transmission of transmitting, when a user message remains in the buffer, the user message through a contention based PUSCH.

Another embodiment of the present invention provides a method for transmitting a user message that is stored in a buffer to a terminal through a network in a base station, the method includes: performing a first-1 transmission of transmitting the user message through a paging channel; performing a first-2 transmission of transmitting, when a user message remains in the buffer, the user message through a radio channel of a common resource; performing a second transmission of transmitting, when a user message remains in the buffer, the user message through a signaling radio bearer channel or a default data radio bearer channel; and performing a third transmission of transmitting, when a user message remains in the buffer, the user message through a scheduled physical downlink shared channel (scheduled-PDSC) that is dedicated allocated to the terminal.

The base station may perform a next transmission step only when a user message remains in the buffer after performing each transmission step and terminate message transmission when a user message does not remain in the buffer.

Yet another embodiment of the present invention provides a terminal that transmits a user message through a network, the terminal including: a buffer that stores a user message to transmit; and a transmission processor that divides and transmits user messages that are stored in the buffer by the available channel resource whenever a data transmittable channel resource is available in a call setting period and a radio resource control connection state with the network.

The transmission processor may include a first transmission processing module that transmits a user message through a radio channel of a common resource; a second transmission processing module that transmits the user message through a signaling radio bearer or a default data radio bearer channel; a third transmission processing module that transmits the user message through a contention based share channel; and a fourth transmission processing module that transmits the user message through a dedicated allocated PUSCH.

Yet another embodiment of the present invention provides a base station that transmits a user message to a terminal through a network, the base station including: a buffer that stores a user message to transmit; and a transmission processor that divides and transmits user messages that are stored in the buffer by the available channel resource whenever a data transmittable channel resource is available in a call setting time period and a radio resource control connection state with the terminal.

The transmission processor includes a first transmission processing module that transmits a user message through a paging channel; a second transmission processing module that transmits a user message through a radio channel of a common resource; a third transmission processing module that transmits the user message through a signaling radio bearer or a default data radio bearer channel; and a fourth transmission processing module that transmits the user message through a PDSC that is dedicated allocated to the terminal.

Yet another embodiment of the present invention provides a method for transmitting a user message.

The method includes: confirming a size of a user message to be transmitted; transmitting the user message through a radio channel of an available common resource when the size of the user message is lower than a predetermined minimum value; transmitting the user message through a signaling radio bearer channel or a default data radio bearer channel when the size of the user message is greater than the minimum value and lower than a predetermined maximum value; and transmitting the user message through a scheduled traffic channel when the size of the user message is greater than the maximum value.

DETAILED DESCRIPTION OF THE EMBODIMENTS

Figure 1:
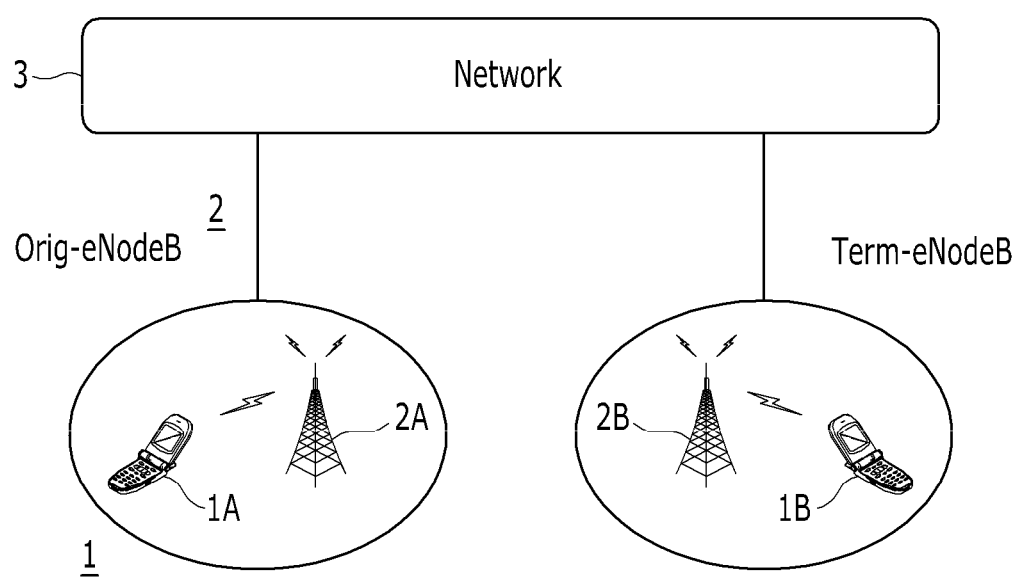
FIG. 1 is a diagram illustrating a network configuration for transmitting a message according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising", will be understood to imply the inclusion of stated elements but not the exclusion of any other elements.

In this specification, a terminal may indicate a mobile station (MS), a mobile terminal (MT), a subscriber station (SS), a portable subscriber station (PSS), a user equipment (UE), and an access terminal (AT) and may include an entire function or a partial function of the MT, the SS, the PSS, and the UE.

In this specification, a base station (BS) may indicate an access point (AP), a node B, a radio access station (RAS), a base transceiver station (BTS), and a mobile multi-hop relay (MMR)-BS and may include an entire function or a partial function of the AP, the RAS, the node B, the BTS, and the MMR-BS.

In a method and apparatus for transmitting a user message according to an exemplary embodiment of the present invention, in a case where a terminal (or a network) in an idle state transmits a user message, whenever a 'data transmittable channel resource' is available during a call setting period, user messages are divided and transmitted.

According to an exemplary embodiment of the present invention, in a state where a radio resource control (RRC) connection of a terminal (or a network) is not performed in a call setting period, and after a radio resource control connection is performed, whenever a data transmittable channel resource is available, multi-step transmission that divides and transmits user messages by an available channel resource is performed.

In an exemplary embodiment of the present invention, a user message includes 'a small quantity of messages' or 'a small quantity of general packet data' that are generated by a subscriber or a random provider, as in a short message service (SMS). A user message may be, for example, a message such as a small quantity of transmission messages or a small quantity of packet data, a small quantity of public information messages, a daily information message in which security is unnecessary, and an urgent message notifying an urgent situation, and my be used as a coupling product service of a provider.

Hereinafter, a method and apparatus for transmitting a user message according to an exemplary embodiment of the present invention will be described with reference to the drawings.

FIG. 1 is a diagram illustrating a configuration of a wireless communication system according to an exemplary embodiment of the present invention.

As shown in FIG. 1, in a wireless communication system according to an exemplary embodiment of the present invention, a terminal 1 is connected to a network 3 through a base station 2. Specifically, a first terminal 1A to transmit a message is connected to the network 3 through an originating base station 2A and a second terminal 1B that receives a message is connected to the network 3 through a terminating base station 2B.

The first terminal 1A that is connected to the originating base station 2A transmits a user message to the second terminal 1B that is positioned at a cell of the terminating base station 2B through the network 3.

In addition, the wireless communication system may include a server necessary for transmitting a user message and an integral device necessary for management, authentication, security, and accounting, and a processing that is related thereto follows a provider policy, and dedicated signaling between a terminal and a base station can be processed by an upper layer (Layer 3).

Figure 2:
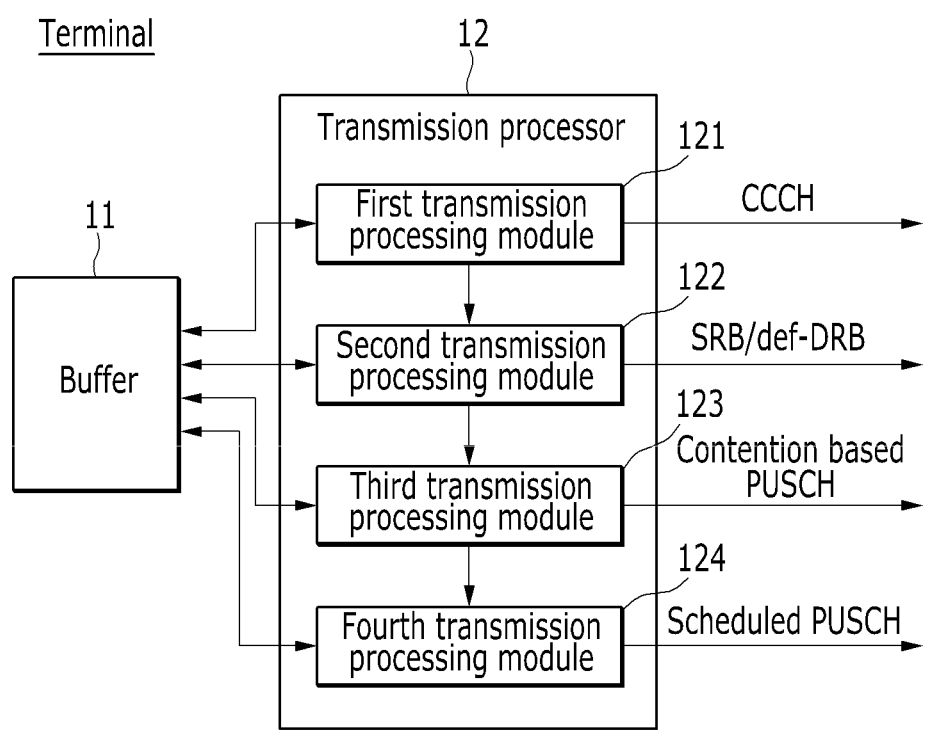
FIG. 2 is a diagram illustrating a configuration of a terminal for transmitting a user message according to an exemplary embodiment of the present invention.

FIG. 2 is a diagram illustrating a configuration of a terminal 1 for transmitting a message according to an exemplary embodiment of the present invention.

As shown in FIG. 2, the terminal 1 according to an exemplary embodiment of the present invention includes a terminal buffer 11 that stores a user message to transmit and a transmission processor 12 that performs a transmission processing of the user message that is stored at the terminal buffer.

The transmission processor 12 includes a plurality of processing modules in order to divide and transmit user messages of an available channel resource whenever a data transmittable channel resource is available in a call setting period and a radio resource control connection (RRC connection) state. Specifically, the transmission processor 12 includes a first transmission processing module 121 that transmits a user message through a radio channel of a common resource, a second transmission processing module 122 that transmits a user message through a signaling radio bearer or a default data radio bearer, a third transmission processing module 123 that transmits a user message through a contention based share channel, and a fourth transmission processing module 124 that transmits a user message through a dedicated allocated channel.

The terminal 1 may include other constituent elements for a general communication processing of the terminal in addition to such constituent elements, and the constituent elements are technology that is known in the art and therefore a detailed description thereof will be omitted.

Figure 3:
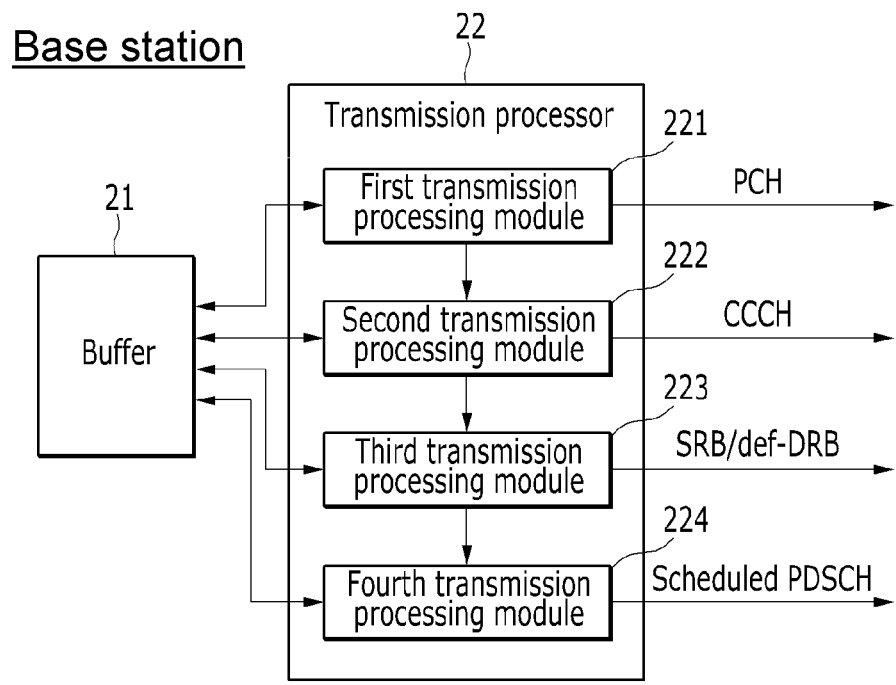
FIG. 3 is a diagram illustrating a configuration of a base station for transmitting a user message according to an exemplary embodiment of the present invention.

FIG. 3 is a diagram illustrating a configuration of a base station for transmitting a message according to an exemplary embodiment of the present invention.

As shown in FIG. 3, the base station 2 according to an exemplary embodiment of the present invention includes a buffer 21 that stores a user message to transmit and a transmission processor 22 that performs a transmission processing of a user message that is stored at the buffer.

The transmission processor 22 includes a plurality of processing modules in order to divide and transmit user messages of an available channel resource whenever a data transmittable channel resource is available in a call setting period and a radio connection state (RRC connection). Specifically, the transmission processor 22 includes a first transmission processing module 221 that transmits a user message through a paging channel, a second transmission processing module 222 that transmits a user message through a radio channel of a common resource, a third transmission processing module 223 that transmits a user message through a signaling radio bearer or a default data radio bearer, and a fourth transmission processing module 224 that transmits a user message through a dedicated allocated channel.

The base station 2 may include other constituent elements for other functions including a general communication processing of a base station in addition to such constituent elements, and the constituent elements is technology that is known in the art and therefore a detailed description thereof will be omitted.

Next, a method of transmitting a user message according to an exemplary embodiment of the present invention will be described based on such a configuration.

Figure 4:
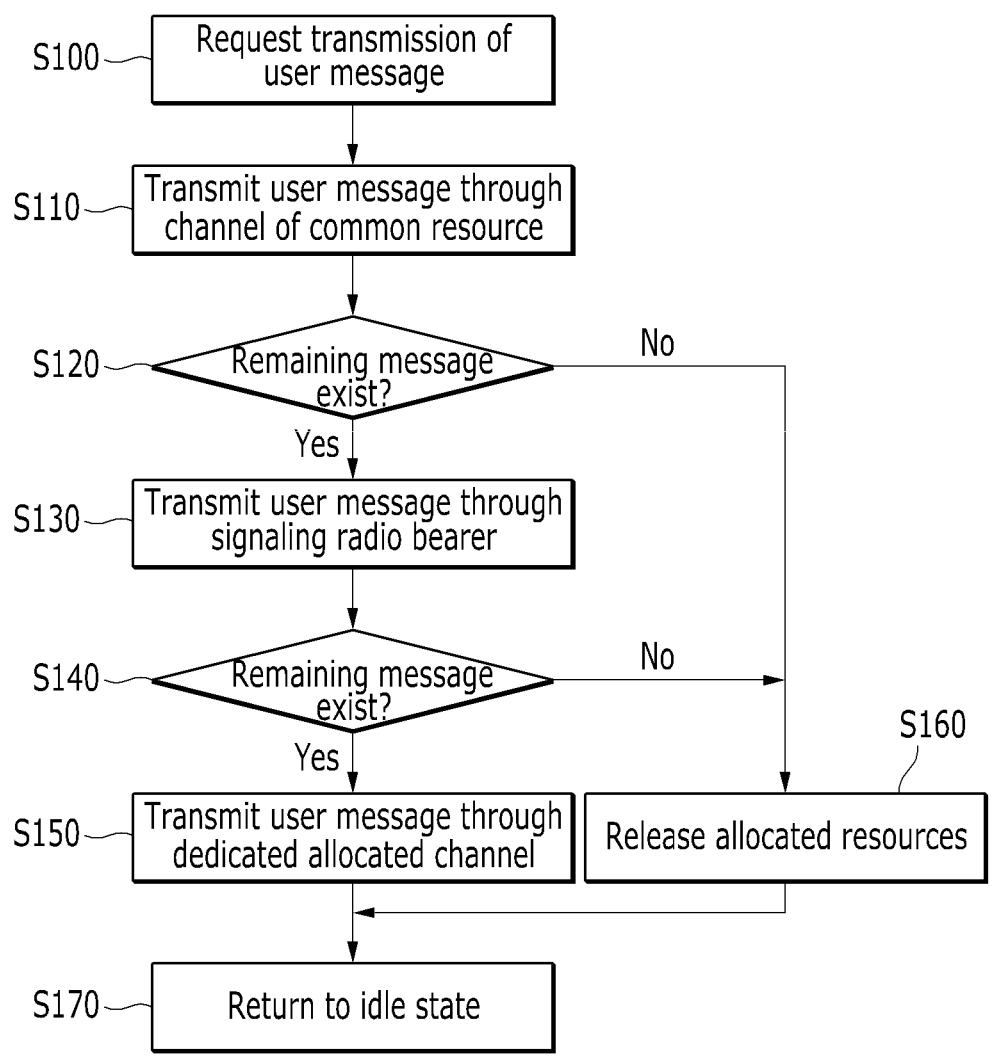
FIG. 4 is a flowchart illustrating a method of transmitting a user message according to an exemplary embodiment of the present invention.

FIG. 4 is a flowchart illustrating a method of transmitting a user message according to an exemplary embodiment of the present invention.

In a transmission method according to an exemplary embodiment of the present invention, whenever a radio channel is available during a call setting time period, a user message is transmitted, and the message is transmitted through the following plurality of steps. Specifically, in an exemplary embodiment of the present invention, in channel resources that can transmit a user message as data, before a radio resource control connection between a terminal and a base station is performed, a user message is transmitted through a channel of a common resource. When all user messages are not transmitted through a channel of a common resource, a user message is transmitted through a signaling radio bearer or a default data radio bearer. Further, when a user message is not transmitted through a wireless bearer, after a radio resource control connection is performed, a user message is transmitted through an allocated dedicated channel according to scheduling.

As shown in FIG. 4, when a user message to transmit exists, a first transmission step is performed. Specifically, it is determined whether a radio channel of a common resource is available and if a radio channel of a common resource is available, a user message is transmitted through a radio channel of an available common resource (S100 and S110). Here, the radio channel of a common resource may be at least one of a common control channel (CCCH) and a paging channel.

Although a user message is transmitted through the first transmission step, i.e., a radio channel of a common resource, when a user message to transmit remains, a second transmission step is performed (S120).

At the second transmission step, a user message is transmitted through a signaling radio bearer (SRB) radio channel or a default data radio bearer (def-DRB) radio channel (S130).

Although a user message is transmitted through the second transmission step, i.e., an SRB radio channel or a def-DRB radio channel, when a message to transmit remains, a third transmission step is performed (S140).

At the third transmission step, a user message is transmitted through a scheduled traffic channel. Specifically, although a user message is transmitted through the first and second transmission steps, when a user message to transmit remains, the user message is transmitted using a scheduled traffic channel, which is an allocated radio resource by a radio resource scheduler (not shown) (S150) and such transmission is performed until all messages remaining in the buffer are transmitted. Here, the scheduled traffic channel is a contention free channel, i.e., a channel operating without competition.

At the first transmission step, the second transmission step, or the third transmission step, when all user messages are transmitted, all related wired/wireless resources are released, and a terminal or a base station, which is a subject that transmits a user message is returned to an idle state (S160 and S170).

In the terminal, step of transmitting a user message through a contention based traffic channel may be additionally performed between the second transmission step and the third transmission step, and for convenience of description, the transmission step is referred to as a fourth transmission step, and this will be described in detail later. In an exemplary embodiment of the present invention, the first, second, third, and fourth representing the first to fourth transmission steps are used as distinguishable meaning representing that each transmission step transmits a user message using different channels rather than order meaning.

As described above, in a method of transmitting a message according to an exemplary embodiment of the present invention, user messages are divided and transmitted during a call setting time period, and particularly, messages are divided and transmitted in a multi-step via a plurality of transmission steps.

Next, a method of transmitting a message according to an exemplary embodiment of the present invention will be described in detail.

Figure 5:
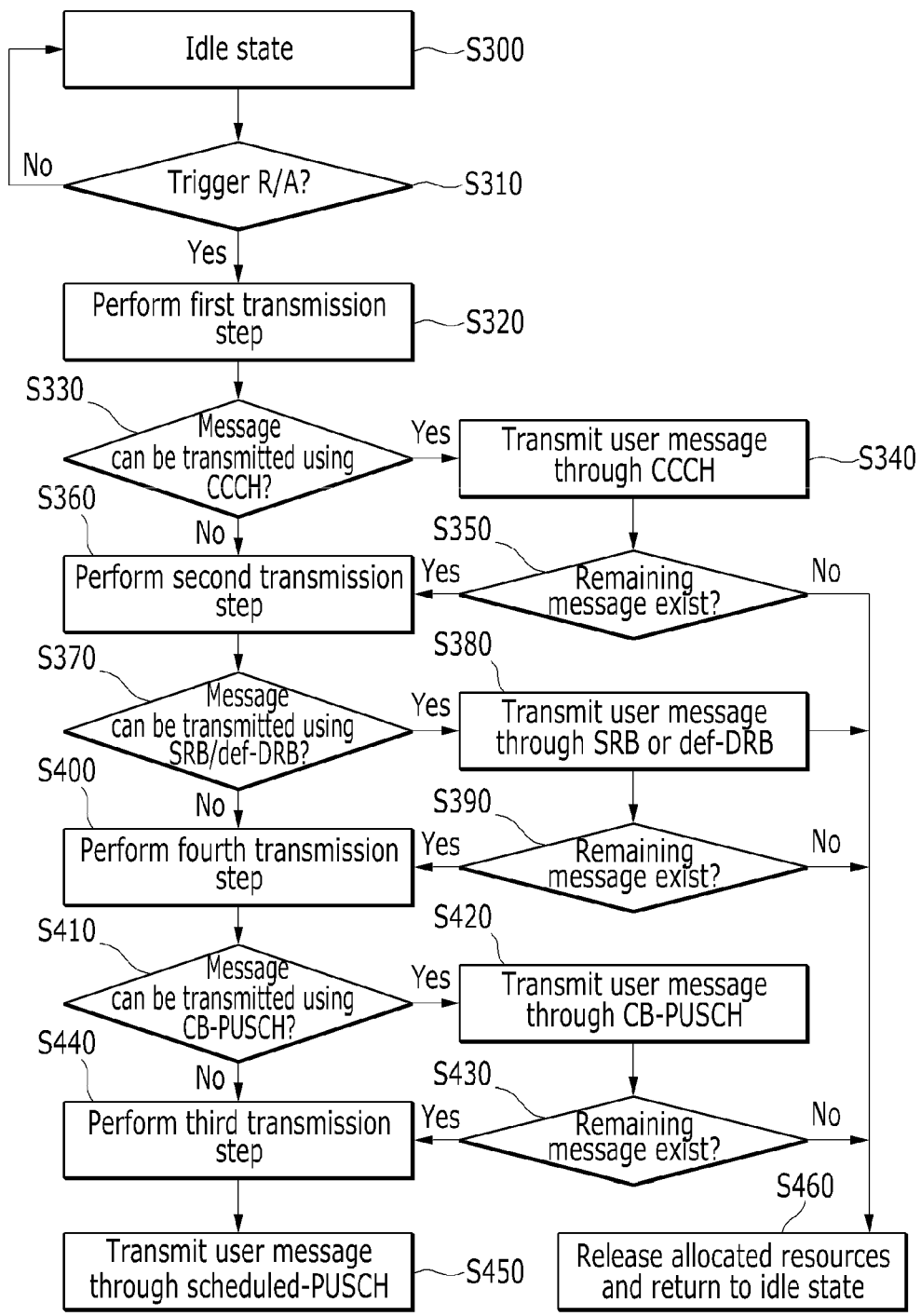
FIG. 5 is a flowchart illustrating a method in which a terminal transmits a user message according to an exemplary embodiment of the present invention.

FIG. 5 is a flowchart illustrating a method in which a terminal transmits a user message according to an exemplary embodiment of the present invention.

As shown in FIG. 5, the terminal 1 to transmit a user message performs an originating side procedure when random access (R/A) is triggered in an idle state (S300 and S310). Here, a method of transmitting a message according to an exemplary embodiment of the present invention is performed according to a cause-type of a generating factor of R/A trigger. That is, when a cause-type of a generating factor of R/A trigger is set to a predetermined parameter according to an exemplary embodiment of the present invention, the following message transmission is performed. Here, the predetermined parameter is "ShortMessageIndicator", but it is not always limited thereto.

The terminal 1 of an idle state is in a state in which authentication is complete through the network 3. Authentication of the terminal 1 is performed through a mobility management entity (MME) of the network 3, and when authentication of the terminal 1 is performed, an authentication result including identification information (e.g., international mobile subscriber identify (IMSI)) of the terminal is stored at the MME and is managed by the MME. An authentication processing of a user message that is transmitted from a corresponding terminal can be performed based on the authentication result.

First, when R/A is triggered and a generating factor thereof is a "ShortMessageIndicator", the terminal 1 performs the first transmission step (S320). For this purpose, the terminal 1 determines whether a radio channel of a common resource (here, a common control channel (CCCH)) is available (S330). When an available resource that can transmit a message remains in the radio channel of a common resource, the terminal 1 receives and processes the stored user message from the buffer 11 and transmits the user message to the base station 2. Such a process is continued until all user messages that are stored in the buffer 11 are transmitted within a transmittable data amount limit through a radio channel of a common resource, i.e., until all user message within the buffer 11 are completely emptied, for example, when data of one bit is remained, transmission is performed (S340).

In this case, the terminal 1 generates a transmission message by coupling signaling information (e.g., M3 dedicated signaling message) to a user message (e.g. short message) to transmit. The transmission message includes a first identifier (e.g., ShortMessageIndicator) representing whether a user message exists. Therefore, the terminating side can easily determine later whether a user message is included based on the first identifier that is included in the received message. The transmission message can be processed and transmitted in a concatenation form.

Further, in order to check whether an error occurs in a user message, error control mechanism of L1/L2 layer can be corrected by an automatic repeat request (ARQ) and a hybrid-ARQ (H-ARQ). Such error control mechanism is technology that is known in the art and therefore a detailed description thereof will be omitted.

At the first transmission step, a size of a user message in which a radio channel of a common resource CCCH can transmit is varied according to an available resource capacity of a radio channel CCCH and a wireless environment quality between a terminal and a base station. If a data amount in which a radio channel of a common resource CCCH can transmit is larger than an amount of user messages in which a terminal is to transmit, a user message transmission procedure according to an exemplary embodiment of the present invention is terminated at the first transmission step. In this case, if all user messages are transmitted through a radio channel of a common resource CCCH, all allocated wired/wireless related resources are released, and the terminal 1 is returned to an idle state (S460).

When the terminal 1 cannot transmit a message using a radio channel of a common resource CCCH or when the remaining user messages exist in the buffer 11 although the first transmission step is performed, the terminal 1 performs a second transmission step (S350 and S360). At the second transmission step, the terminal 1 determines whether the terminal 1 can transmit a user message using a signaling radio bearer (SRB) radio channel or a default data radio bearer (def-DRB) radio channel (S370), and if the terminal 1 can transmit a user message, the terminal 1 transmits user messages remaining in the buffer 11 (S380).

In this case, when it is necessary to encrypt a user message to transmit, the terminal 1 sets a parameter in order to transmit a user message that should be encrypted at the third transmission step. That is, an encryption identification parameter representing necessity of encryption is set to a message that should be encrypted. A message that should be encrypted sets an encryption identification parameter in order to transmit at the third transmission step that transmits through a resource that is dedicated allocated to the terminal 1. For example, while a message that should be encrypted is processed as a dedicated signaling message, by setting an encryption identification parameter, i.e., 'ShortMessageSecurityCheck' within a dedicated signaling message to "1", it is represented that a corresponding message should be encrypted. In this case, when it is unnecessary to encrypt a corresponding message, an encryption identification parameter 'ShortMessageSecurityCheck' is set to '0'. In this way, a user message in which an encryption identification parameter is set is stored at the buffer and then is transmitted at the third transmission step.

Such a process is repeatedly performed until user messages are emptied within the buffer 11 within a transmittable data amount limit of an SRB radio channel or a def-DRB radio channel, and when all user messages within the buffer 11 are transmitted, the terminal 1 is returned to an idle state (S460).

When the terminal 1 cannot transmit a message using an SRB radio channel or a def-DRB radio channel or when the remaining user messages exist in the buffer 11 although the second transmission step is performed, a fourth transmission step is performed (S390 and S400).

At the fourth transmission step, the terminal 1 determines whether the terminal 1 can transmit a message using a contention based physical shared channel (CB-PUSCH) (S410), and if the terminal 1 can transmit a message, the terminal 1 transmits a user message in the buffer 11 through the CB-PUSCH (S420). Because the CB-PUSCH is a common resource in which all users can use, when transmitting a message using the channel, a collision between terminals may occur. Therefore, in order to minimize collision phenomenon of the terminal 1, a data transmission time point of each terminal uses back-off algorithm according to random access. Such backoff algorithm is technology that is known in the art and therefore a detailed description thereof will be omitted.

Such a process is repeatedly performed until user messages are emptied within the buffer 11 within a transmittable data amount limit of CB-PUSCH, and when all user messages are transmitted within the buffer 11, the terminal 1 is returned to an idle state (S460).

When the terminal 1 cannot transmit a message using the CB-PUSCH or when the remaining user messages exist in the buffer 11 although the fourth transmission step is performed, the third transmission step is performed (S430 and S440).

At the third transmission step, the terminal 1 transmits a user message using a channel that is allocated by a radio resource scheduler of the base station 2, i.e., a scheduled physical uplink shared channel (scheduled-PUSCH) (S450). In this case, user messages that are classified as a message in which encryption is necessary at the second transmission step are transmitted through the scheduled-PUSCH after an encryption processing.

Such a process is repeatedly performed until user messages are emptied within the buffer 11 through a scheduled-PUSCH that is dedicated allocated to the terminal 1, and when all user messages within the buffer 11 are transmitted, the terminal 1 is returned to an idle state (S460).

Next, as described above, a method in which the base station 2 transmits a message that is transmitted from the terminal 1 to a terminating terminal will be described.

Figure 6:
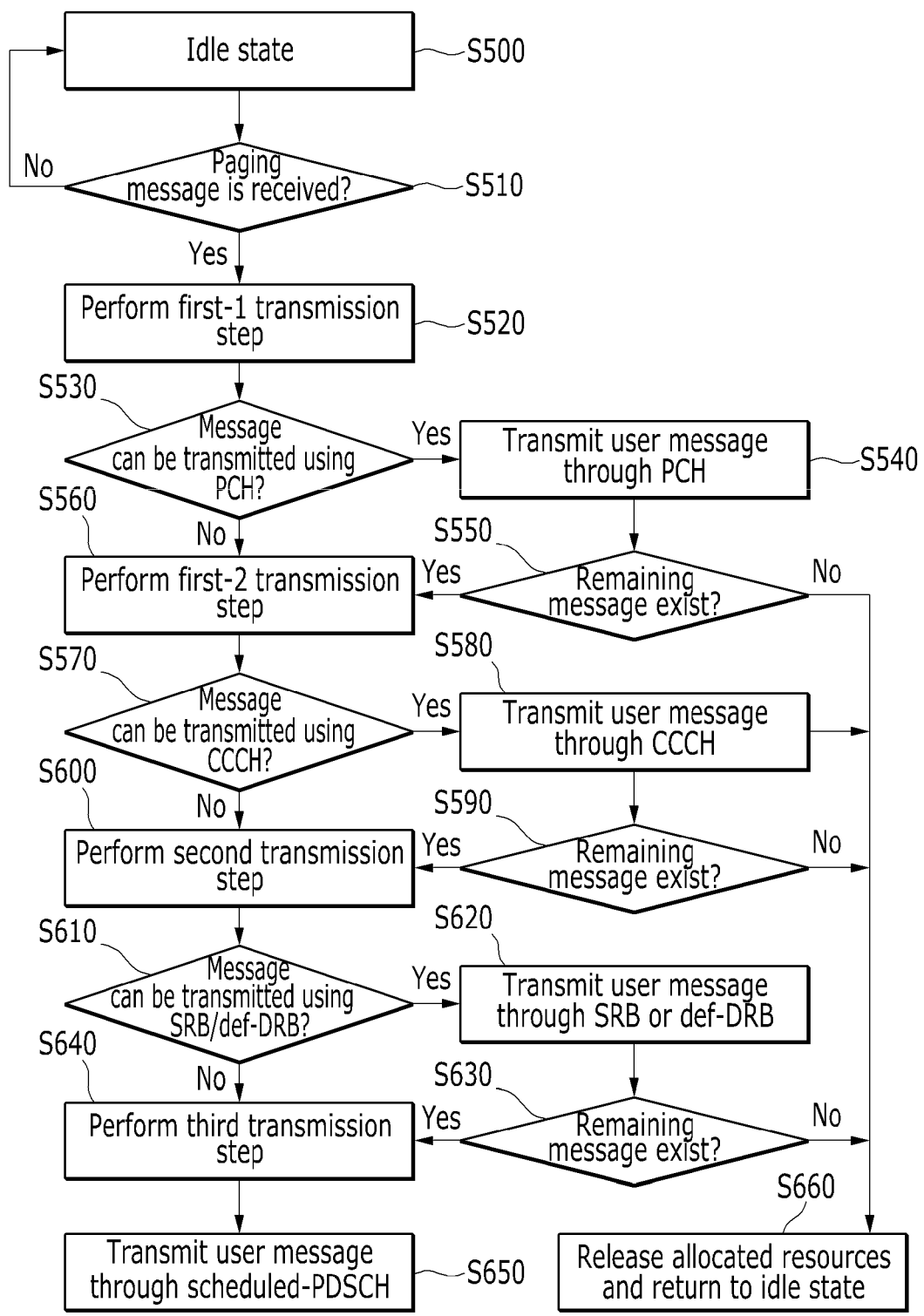
FIG. 6 is a flowchart illustrating a method in which a base station transmits a user message according to an exemplary embodiment of the present invention.

FIG. 6 is a flowchart illustrating a method in which a base station transmits a message to a terminating terminal according to an exemplary embodiment of the present invention.

As described above, a message that is transmitted from an originating terminal is stored at the base station buffer 21 of a base station 2 in the originating side and the base station 2 transmits a user message that is stored at the base station buffer 21 to the terminating terminal, for example, the second terminal 1B.

When the base station 2 is in an idle state, if a paging message is received (S500), the base station 2 performs a terminating side procedure and when a cause-type of a generating factor of a paging message is a predetermined parameter, i.e., "ShortMessageIndicator", the base station 2 transmits a user message to the terminating terminal (S510).

First, as shown in FIG. 6, the base station 2 determines whether a paging channel PCH is available with the second terminal 1B, which is the terminating terminal (S520 and S530), and if a paging channel PCH is available with the second terminal 1B, the base station 2 transmits a user message that is stored at the base station buffer 21 to the second terminal 1B through the paging channel (S540). Step of transmitting a user message through a paging channel corresponds to the first transmission step of transmitting a message through a common resource. Here, in order to distinguish from step of transmitting a message through the CCCH, for convenience of description, step of transmitting a user message through a paging channel is referred to as 'a first-1 transmission step', and step of transmitting a user message through the CCCH is referred to as 'a first-2 transmission step'.

At the first-1 transmission step, the base station 2 maps an incoming call number (i.e., a number of the second terminal) to a user message and transmits the user message. In this case, the base station 2 transmits a user message to correspond to one-to-one using characteristics of a paging channel. That is, the base station 2 can transmit a user message to a terminating terminal. Alternatively, 1 to N transmission can be performed, i.e., a user message can be transmitted to a plurality of terminating terminals.

Further, the base station 2 couples a paging message, which is original signaling information and a short message to transmit through a paging channel and transmits the coupled message in a concatenation form to the second terminal 1B, which is a terminating terminal. In this case, the coupled message includes a first identifier (e.g., ShortMessageIndicator) representing whether a user message is included and is transmitted to the second terminal 1B.

When all user messages within the buffer 21 of the base station are transmitted to the terminating terminal through a paging channel PCH, the base station 2 is returned to an idle state (S660), however when a message cannot be transmitted through the paging channel or when a user message to transmit remains in the buffer 21 of the base station, a first-2 transmission step is performed (S550 and S560).

Similarly to the first transmission step that is performed in the terminal 1, at the first-2 transmission step that is performed in the base station 2, the base station 2 transmits a user message within the buffer 21 through a radio channel of a common resource CCCH (S570 and S580). In this case, when a radio channel of a common resource CCCH is available (e.g., RRC connection setup/M4 time point), if all user messages are transmitted through the CCCH, all allocated wired/wireless related resources are released and the base station 2 is returned to an idle state (S660).

When a message cannot be transmitted using the radio channel of a common resource CCCH or when the remaining user messages exist in the buffer 21 although the first-2 transmission step is performed, the base station 2 performs a second transmission step (S590 and S600). Here, the second transmission step is performed, similarly to the second transmission step of the terminal 1. Specifically, the base station 2 transmits a user message using an SRB radio channel or a def-DRB radio channel (S610 and S620), and when all user messages are transmitted, the base station 2 is returned to an idle state (S660).

When a message cannot be transmitted using an SRB radio channel or a def-DRB radio channel or when the remaining user messages exist in the buffer 21 although the second transmission step is performed, the base station 2 performs a third transmission step (S630 and S640).

Specifically, when a user message to transmit still exists in the buffer 21, the base station 2 transmits a user message using a scheduled physical downlink shared channel (Scheduled-PDSC) that is allocated to the terminating terminal by a radio resource scheduler (not shown) of the base station 2 (S650). Such a process is performed until all user messages that are stacked in the buffer 21 are transmitted. If transmission of a user message is complete, all allocated wired/wireless related resources are released, and the base station 2 is returned to an idle state (S660).

Next, a user message transmission process that is performed in the above-described terminal and base station will be described according to a message flow.

Figure 7:
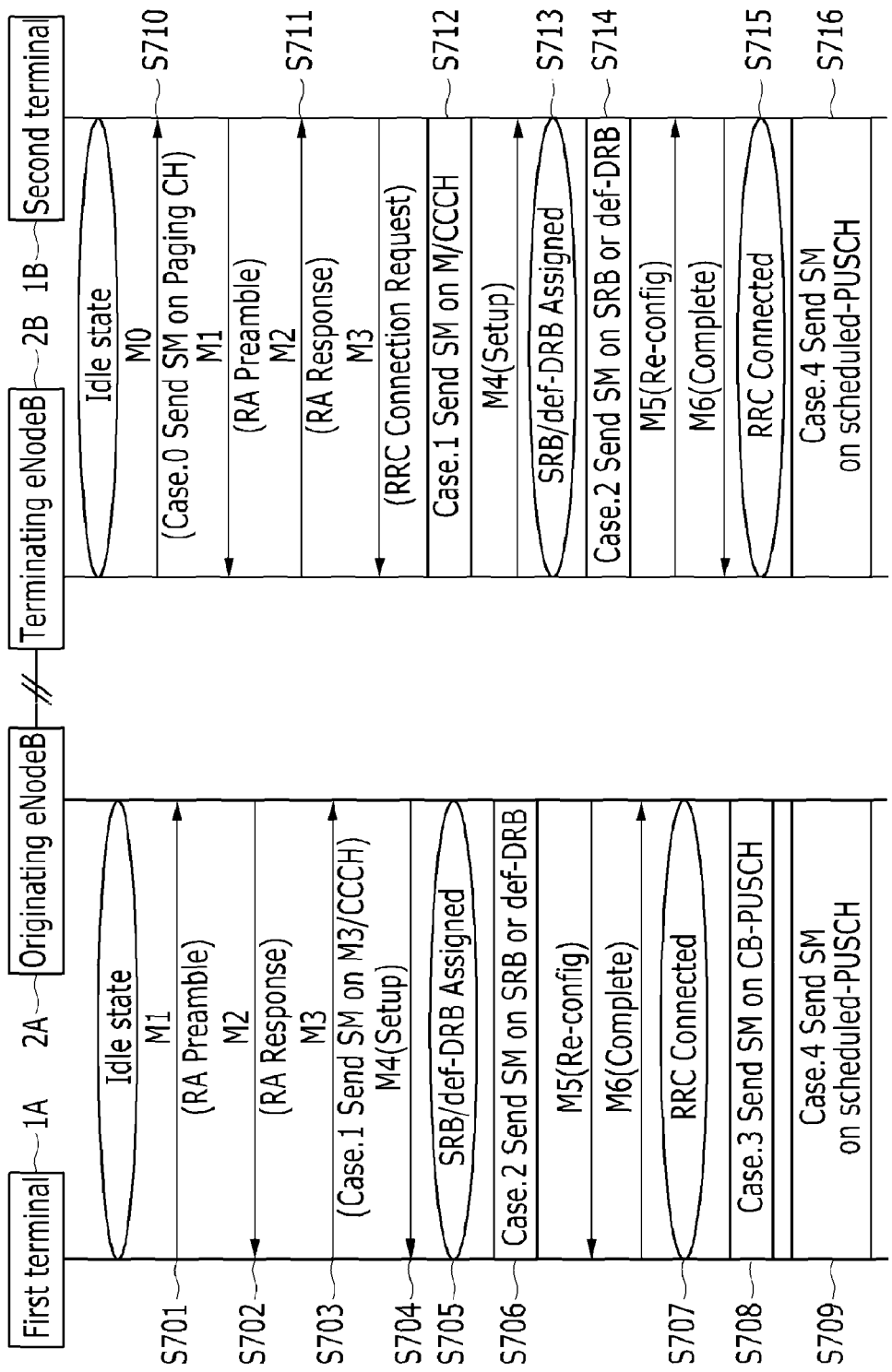
FIG. 7 is a flowchart illustrating a method of transmitting a user message based on a message transmission flow according to an exemplary embodiment of the present invention.

FIG. 7 is a flowchart illustrating a method of transmitting a user message based on a message transmission flow according to an exemplary embodiment of the present invention. Specifically, FIG. 7 illustrates a time point that can transmit a user message according to the message transmission method on each transmission step basis in a wireless communication system (see FIG. 1) that is formed with the first terminal 1A, which is an originating terminal, an originating base station 2A, a network 3, a terminating base station 2B, and the second terminal 1B, which is a terminating terminal. Herein, the originating base station 2A is referred as an originating eNodeB 2A and the terminating base station is referred as a terminating eNodeB 2B.

As shown in FIG. 7, when the first terminal 1A receives a new call for transmitting a user message in an idle state, the first terminal 1A performs a random access preamble procedure (S701-S702) by connecting with the originating eNodeB 2A and a cause-type of a generating factor of random access is set to "ShortMessageIndicator", and message transmission is performed as follows.

In an incoming signal in which the first terminal 1A requests a user message, the first terminal 1A performs a first transmission step that transmits a user message through the radio channel of a common resource CCCH (S703).

When the first terminal 1A does not transmit all user messages through the first transmission step, the first terminal 1A performs a second transmission step, and in this case, the originating eNodeB 2A transmits a setup message M4 (S704)

and allocates an SRB radio channel or a def-DRB radio channel to the first terminal 1A (S705). Thereafter, the first terminal 1A transmits a user message through the allocated SRB radio channel or def-DRB radio channel (S706).

When all user messages are not transmitted even through the second transmission step that uses the SRB radio channel or the def-DRB radio channel, the first terminal 1A performs a third transmission step. In this case, in order to reconstruct a wireless link with the first terminal 1A, the originating eNodeB 2A transmits a reconfiguration message M5 to the first terminal 1A and sets an RRC connection with the first terminal 1A. Thereafter, in a state where an RRC connection is performed (S707), the first terminal 1A performs a fourth transmission step that transmits a user message through a contention based physical uplink shared channel, i.e., a CB-PUSCH (S708).

When all user messages are not transmitted even through the fourth transmission step using the CB-PUSCH, the first terminal 1A performs a fourth transmission step. The first terminal 1A transmits a user message from the originating eNodeB 2A through a dedicated allocated scheduled-PUSCH according to an RRC connection (S709).

The user message that is transmitted from the first terminal 1A through such a process is transmitted to the terminating eNodeB 2B through a network, and the terminating eNodeB 2B transmits the user message in the buffer to the second terminal 1B, which is the terminating terminal as follows.

As shown in FIG. 7, when the terminating eNodeB 2B receives a paging message in an idle state, if a paging channel is available, the terminating eNodeB 2B performs a first-1 transmission step that transmits a user message through the paging channel (S710).

The terminating eNodeB 2B maps the number of the second terminal 1B, which is the terminating terminal to a user message, couples the user message to an original paging message, and transmits the coupled message to the second terminal 1B through the paging channel.

Thereafter, the terminating eNodeB 2B performs a corresponding procedure according to a random access preamble procedure request from the second terminal 1B (S711).

At the first-1 transmission step, when all user messages are not transmitted, the terminating eNodeB 2B transmits a user message to the second terminal 1B through a radio channel of a common resource by performing a first-2 transmission step (S712).

Thereafter, the terminating eNodeB 2B allocates an SRB radio channel or a def-DRB radio channel to the second terminal 1B (S713), and when all user messages are not transmitted at the first-2 transmission step, the second transmission step that transmits a user message through the SRB radio channel or the def-DRB radio channel is performed (S714).

The terminating eNodeB 2B performs an RRC connection with the second terminal 1B through a reconfiguration message M5 and allocates a dedicated traffic channel (S715), and when all user messages are not transmitted through the second transmission step, a third transmission step that transmits a user message through a dedicated traffic channel that is allocated to the second terminal 1B, i.e., a scheduled-PDSC is performed (S716). The third transmission step is performed until all user messages that are stacked to a buffer of the terminating eNodeB 2B are transmitted.

If transmission of a user message is complete, all allocated wired/wireless related resources are released and the terminating eNodeB 2B is returned to an idle state, and all steps are terminated.

Figure 8:
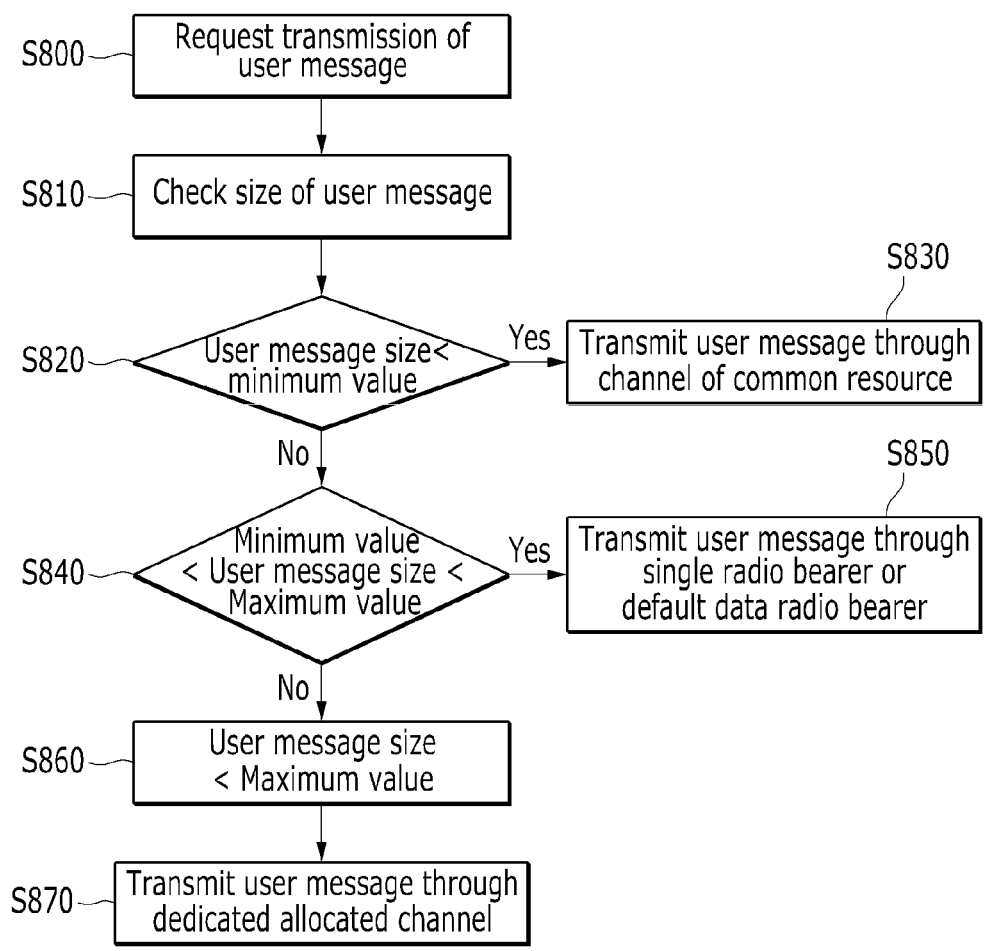
FIG. 8 is a flowchart illustrating a method of transmitting a user message according to another exemplary embodiment of the present invention.

Meanwhile, it is possible to transmit a user message under consideration of the size of the user message according to another exemplary embodiment of the present invention. FIG. 8 is a flowchart illustrating a method of transmitting a user message according to another exemplary embodiment of the present invention.

According to another exemplary embodiment of the present invention, as shown in FIG. 8, when there is a user message to be transmitted during a call setting time period, a size of the user message is confirmed (S800 and S810).

The size of the user message is compared with a predetermined minimum value and a predetermined maximum value, respectively. Specifically, if the size of the user message is lower than the minimum value, the corresponding user message is transmitted through a radio channel of an available common resource (S820 and S830). Here, the radio channel of a common resource may be at least one of a common control channel and a paging channel.

Meanwhile, if the size of the user message is greater than the minimum value and lower than the maximum value, the user message is transmitted through a signaling radio bearer (SRB) channel or a default data radio bearer (def-DRB) channel (S840 and S850).

Meanwhile, if the size of the user message is greater than the maximum value, the user message is transmitted through a scheduled traffic channel, which is an allocated radio resource by a radio resource scheduler (not shown) (S860 and S870).

Here, the maximum value and the minimum vales may vary according to the policy of a communication service provider.

The method of transmitting a user message according to another exemplary embodiment of the present invention may be applied to a terminal or a base station and also may be applied to the pre-described exemplary embodiment of the present invention. The method of transmitting a user message according to another exemplary embodiment of the present invention has an advantage of efficiently transmitting a user message base on the size of the user message.

According to an exemplary embodiment of the present invention, by dividing and transmitting a user message over a plurality of steps whenever a radio channel resource is available during a call setting period of a wireless communication system, the quantity of call setting messages necessary for transmitting a user message can be reduced. Further, a signaling load necessary when transmitting a small quantity of user messages can be reduced and resultantly power of a terminal can be saved and a radio resource can be saved. Particularly, when transmitting a user message having a large scale of demand, as in a short message service (SMS), by more effectively reducing the quantity of messages necessary when transmitting a user message, an overall signaling load can be greatly reduced.

An exemplary embodiment of the present invention may be not only embodied through the above-described apparatus and/or method but also embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a user message that is stored at a buffer through a network in a terminal, the method comprising:
performing a first transmission of transmitting a user message through a radio channel of a common resource;
performing a second transmission of transmitting, when a user message remains in the buffer, the user message through a signaling radio bearer channel or a default data radio bearer channel; and
performing a third transmission of transmitting, when a user message remains in the buffer, the user message through a scheduled physical uplink shared channel (scheduled-PUSCH) that is dedicated allocated to the terminal.

2. The method of claim 1, further comprising performing a fourth transmission of transmitting, when a user message remains in the buffer, the user message through a contention based PUSCH.

3. The method of claim 1, wherein when a radio connection is set between the terminal and a base station, during a call setting time period, the first transmission, the second transmission, the fourth transmission, and the third transmission are performed in order.

4. The method of claim 3, wherein after performing the each transmission step, only when a user message remains in the buffer, a next transmission step is performed, and when a user message does not remain in the buffer, message transmission is terminated.

5. The method of claim 1, wherein in the first transmission,
the terminal generates a message in which signaling information is coupled to the user message, includes an identifier representing that a user message is included in the coupled message, and transmits the coupled message.

6. The method of claim 1, wherein in the second transmission,
when the user message should be encrypted, the terminal adds an identification parameter representing encryption to a corresponding user message and stores the user message in the buffer.

7. The method of claim 6, wherein in the third transmission,
when an identification parameter representing encryption is set to the user message that is stored in the buffer, the terminal encrypts a corresponding user message and transmits the user message through the scheduled-PUSCH.

8. The method of claim 1, wherein in third transmission,
until all user messages in the buffer are to be transmitted, the terminal repeats a process of transmitting the user message.

9. A method for transmitting a user message that is stored in a buffer to a terminal through a network in a base station, the method comprising:
performing a first-1 transmission of transmitting the user message through a paging channel;
performing a first-2 transmission of transmitting, when a user message remains in the buffer, the user message through a radio channel of a common resource;
performing a second transmission of transmitting, when a user message remains in the buffer, the user message through a signaling radio bearer channel or a default data radio bearer channel; and
performing a third transmission of transmitting, when a user message remains in the buffer, the user message through a scheduled physical downlink shared channel (scheduled-PDSC) that is dedicated allocated to the terminal.

10. The method of claim 9, wherein in a state of which a radio connection is set between a terminal and the base station, during a call setting time period, the base station performs a next transmission step only when a user message remains in the buffer after performing each transmission step and terminates message transmission when a user message does not remain in the buffer.

11. The method of claim 9, wherein in the first-1 transmission,
the base station maps an incoming call number of the terminal to the user message, generates a message by coupling with a paging message, includes an identifier representing that a user message is included in the coupled message, and transmits the coupled message.

12. A terminal that transmits a user message through a network, the terminal comprising:
a buffer that stores a user message to transmit; and
a transmission processor that divides and transmits user messages that are stored in the buffer by available channel resource whenever a data transmittable channel resource is available in a call setting period and a radio resource control connection state with the network,
wherein the transmission processor comprises a first transmission processing module that transmits a user message through a radio channel of a common resource,
a second transmission processing module that transmits the user message through a signaling radio bearer or a default data radio bearer,
a third transmission processing module that transmits the user message through a contention based share channel, and
a fourth transmission processing module that transmits the user message through a dedicated allocated physical uplink shared channel (PDSC).

13. The terminal of claim 12, wherein the each transmission processing module terminates a message transmission processing when all user messages that are stored in the buffer are transmitted and requests a transmission processing of the user message to another transmission processing module when a user message remains in the buffer even after transmitting user messages by a transmittable amount of a corresponding channel.

14. The terminal of claim 13, wherein the message transmission processing is performed in order of the first transmission processing module, the second transmission processing module, the third transmission processing module, and the fourth transmission processing module.

15. A base station that transmits a user message to a terminal through a network, the base station comprising:
a buffer that stores a user message to transmit; and
a transmission processor that divides and transmits user messages that are stored in the buffer by available channel resource whenever a data transmittable channel resource is available in a call setting period and a radio resource control connection state with the terminal,
wherein the transmission processor comprises a first transmission processing module that transmits a user message through a paging channel,
a second transmission processing module that transmits a user message through a radio channel of a common resource, a third transmission processing module that transmits a user message through a signaling radio bearer or a default data radio bearer, and a fourth transmission processing module that transmits a user message through a physical uplink shared channel (PDSC) that is dedicated allocated to the terminal.

16. The base station of claim 15, wherein the each transmission processing module terminates a message transmission processing when all user messages that are stored in the buffer are transmitted and requests a transmission processing of user messages to another transmission processing module when user messages remain in the buffer even after transmitting user messages by a transmission available amount of a corresponding channel.

\* \* \* \* \*